(12) United States Patent
Kerning (10) Patent No.: US 12,497,087 B2
(45) Date of Patent: *Dec. 16, 2025

(54) POSITIVE TRAIN CONTROL IMPLEMENTATION SYSTEM

(71) Applicant: Daniel Kerning, Garden City, NY (US)

(72) Inventor: Daniel Kerning, Malverne, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 18/676,543

(22) Filed: May 29, 2024

(65) Prior Publication Data

US 2024/0308560 A1 Sep. 19, 2024

Related U.S. Application Data

(63) Continuation of application No. 17/141,372, filed on Jan. 5, 2021, now Pat. No. 11,999,398.

(Continued)

(51) Int. Cl.
*B61L 27/57* (2022.01)
*B61L 25/02* (2006.01)
(Continued)

(52) U.S. Cl.
CPC ............ *B61L 27/57* (2022.01); *B61L 25/025* (2013.01); *B61L 27/70* (2022.01); *G06F 3/0484* (2013.01)

(58) Field of Classification Search
None
See application file for complete search history.

(56) References Cited

U.S. PATENT DOCUMENTS

| 5,950,966 A | 9/1999 | Hungate |
| 6,655,639 B2 | 12/2003 | Grappone |

(Continued)

FOREIGN PATENT DOCUMENTS

| CA | 2783936 C | 3/2017 |
| WO | 2005025962 A2 | 3/2005 |

(Continued)

OTHER PUBLICATIONS

Resor et al "Positive Train Control (PTC): Calculating Benefits and Costs of a New Railroad Control Technology", Dec. 2005, Research in Agricultural & Applied Economics Digital Library, pp. 77-98 (Year: 2005).*

(Continued)

*Primary Examiner* — Romain Jeanty

(74) *Attorney, Agent, or Firm* — Thomas A. O'Rourke; James Bongiorno; O'Rourke IP Law, PLLC (57) ABSTRACT

A method of installing/verifying positive train control components begins by entering component details into a data entry screen (e.g., a component type; serial number; name of the installer; train line name; a location description). A rough installation location is determined, and the component is installed. A GPS receiver determines the exact location of the installed component, which is entered with the component details. Photographs of the installed component are attached thereto. An installation icon for the installed component is overlaid on a digital map at the determined GPS location. Toggling the installation icon causes displaying of the data. An inspector physically verifies the entered details and GPS location of the installed component using a verification screen, and a third-party GPS receiver. When the two GPS obtained positions are within a threshold amount, and the details are correct, the inspector toggles a radio button confirming the data, which is otherwise corrected.

7 Claims, 10 Drawing Sheets

(6 of 10 Drawing Sheet(s) Filed in Color)

Related U.S. Application Data (60) Provisional application No. 62/966,572, filed on Jan. 28, 2020.

(51) Int. Cl.
*B61L 27/70* (2022.01)
*G06F 3/0484* (2022.01)

(56) References Cited

U.S. PATENT DOCUMENTS

| | | | |
|---|---|---|---|
| 7,395,141 B1 | 7/2008 | Seck | |
| 7,688,218 B2* | 3/2010 | LeFebvre | B61L 27/40 340/682 |
| 7,731,129 B2 | 6/2010 | Stull | |
| 8,082,071 B2 | 12/2011 | Daum | |
| 8,825,263 B1 | 9/2014 | Nelson, Jr. | |
| 9,714,041 B2* | 7/2017 | Oswald | B61L 15/0072 |
| 9,841,287 B1 | 12/2017 | Hayward | |
| 10,315,673 B2 | 6/2019 | Chung | |
| 11,014,588 B2* | 5/2021 | Saxena | B61L 23/042 |
| 2008/0065282 A1 | 3/2008 | Daum | |
| 2009/0118970 A1* | 5/2009 | Daum | B61L 15/0058 701/102 |
| 2012/0325980 A1 | 12/2012 | Noffsinger | |
| 2013/0018536 A1 | 1/2013 | Cooper | |
| 2014/0138493 A1 | 5/2014 | Noffsinger | |
| 2014/0277824 A1 | 9/2014 | Kernwein | |
| 2014/0277954 A1 | 9/2014 | Nelson, Jr. | |
| 2015/0200712 A1 | 7/2015 | Cooper | |
| 2015/0232110 A1 | 8/2015 | Ghaly | |
| 2016/0121912 A1 | 5/2016 | Puttagunta | |
| 2016/0194012 A1 | 7/2016 | Matthews | |
| 2018/0127006 A1* | 5/2018 | Wade | B61L 23/04 |
| 2018/0170415 A1* | 6/2018 | Oswald | B61L 25/023 |

FOREIGN PATENT DOCUMENTS

| | | |
|---|---|---|
| WO | 2011125074 A1 | 10/2011 |
| WO | 2012174382 A1 | 12/2012 |
| WO | 2013056244 A1 | 4/2013 |

OTHER PUBLICATIONS

Ronald "The State of Positive Train Control Implementation in the United States", Sep. 2018, Federal Railroad Administration U.S. Department of Transportation, Pages (Year: 2018).*

Zhang et al. "Positive Train Control (PTC) for railway safety in the United States: Policy develpoments and critical issues", Apr. 2018. Utilities Policy. pp. 33-40 (Year 2018).

Miasayuki "The Revolution of Train Control System in Japan", Dec. 2005, IEEE, pp. 599-606 (Year: 2005).

\* cited by examiner

POSITIVE TRAIN CONTROL IMPLEMENTATION SYSTEM

CROSS-REFERENCES

This application is a continuation of U.S. patent application Ser. No. 17/141,372, filed on Jan. 5, 2021, which claims priority on U.S. Provisional Patent Application Ser. No. 62/966,572, filed on Jan. 28, 2020, having the title "Positive Train Control," and on U.S. Provisional Patent Application Ser. No. 63/074,016, filed on Sep. 3, 2020, having the title "Positive Train Control Implementation System," all disclosures of which are incorporated herein by reference.

FIELD OF THE INVENTION

The subject technology relates generally to improvements in rail travel safety through the use of positive train controls, and more particularly to an application running on a computer system and network configured for use in a method of installing, monitoring, and managing the implementation of positive control system (PTC).

BACKGROUND OF THE INVENTION

Travel by railroad and airplane is statistically much safer than traveling by car; however, accidents that occur in the form of an airplane crash or a train derailment garner intense media coverage, and scrutiny by the NTSB and the public. They are rare in comparison and far more spectacular than a fender-bender.

Although train-automobile collisions at railroad crossings account for many rail accidents, train derailments occur at a surprisingly high frequency. Statistics from the National Transportation Safety Bureau show that roughly every hour and a half a train collides with another object or becomes derailed, and that every two weeks a train carrying hazardous materials is derailed. Derailments occur for a number of reasons, including collisions, improper switch positioning, excessive speeds, etc.

On Sep. 12, 2008 a Union Pacific freight train collided with a MetroLink commuter train in Southern California, killing 25 people and injuring 135 others. By October of 2008, the Rail Safety Improvement Act was signed into law, requiring the implementation of Positive Train Control (PTC) technology on most U.S. rail systems.

In general, PTC technology is designed to prevent train-to-train collisions, derailments caused by excessive speeds, and unscheduled/unauthorized train movement due to switches left in the wrong position. PTC therefore would include a complex communication system capable of monitoring train positions and speeds, and switch positions throughout the U.S. rail system.

The unfunded mandate imposed by the Rail Safety Improvement Act of 2008 has proved to be controversial and difficult to implement. The nationwide cost to develop and implement PTC technology by the 2015 deadline was estimated to be between $6 billion and $22 billion; however, the total cost of rail accidents, apart from the loss of human life, which would otherwise have been saved during a studied 12-year period by a fully implemented PTC system was much less. Therefore, the mandated implementation was economically unjustified. Moreover, there are several competing PTC technologies that have undergone development, further complicating nationwide integration and leaving unresolved questions about interoperability and reliability. (See e.g., U.S. Patent and Patent Application Pub. Nos.: U.S. Pat. No. 10,315,673 to Chung; U.S. Pat. No. 8,082,071 to Daum; U.S. Pat. No. 6,655,639 to Grappone; U.S. Pat. No. 5,950,966 to Hungate; and 2017/0050655—Bergstein).

In 2013, a spectacular train derailment occurred when an early morning commuter train into New York City was traveling at 82 mph around a curve with a 30 mph speed limit, killing four and injuring 60 others, which punctuated the need for full PTC implementation.

However, the deadline for full implementation was extended to the end of 2018 by the Surface Transportation Extension Act of 2015, but rail lines that met certain critical milestones were able to extend that deadline an additional two years, until Dec. 31, 2020.

The U.S. Department of Transportation's Federal Railroad Administration (FRA) is overseeing PTC implementation. FRA data from the end of 2019 shows that freight railroads had successfully implemented PTC on a high percentage of its tracks, but PTC implementation on commuter railroads was only roughly half way completed.

The process for monitoring and managing the progress of PTC implementation is cumbersome and manual, and a failure to properly and completely implement each system and subsystem could have deadly consequences. Thus, there remains an unmet need for a more robust method for installing, monitoring, and managing the process of installing PTC component to achieve full implementation.

The apparatus and method disclosed herein provide a solution for that unmet need.

OBJECTS OF THE INVENTION

It is an object of the invention to provide a method of improving the implementation of PTC systems.

It is a further object of the invention to provide a method of verifying the full implementation of a PTC system.

It is another object of the invention to provide apparatus and a computer-implemented system for tracking the incremental installation of positive train controls on a rail system.

It is a further object of the invention to map PTC implemented rail systems on a map overlay.

It is another object of the invention to provide apparatus with a reporting capability to report each PTC installation, to verify its operability, and to report on any required PTC maintenance.

Further objects and advantages of the invention will become apparent from the following description and claims, and from the accompanying drawings.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Apparatus and a method of installing and verifying the installation of one or more components of a positive train control (PTC) system may involve use of an application tailored to run on a mobile computing device (e.g., a ruggedized iPad®). The improved installation and verification process may begin by entering one or more details about a first component of the PTC system into a data entry screen of the mobile computing device (e.g., entering a type of the first component; entering a serial number of the first component; entering a name of the installer of the first component; entering a train line name; and entering a location description).

Next, a rough installation location for the first component of the PTC system may be determined, and subsequently, the first component of the PTC system may be installed by an installation worker. The work crew may use a GPS receiver to determine the GPS location of the installed first component, and may enter and/or associate, in the mobile computing device, the GPS location of the installed first component with the one or more entered details of the first component. The work crew may also take one or more photographs of the installed first component, and may use the application for attaching the photograph(s) of the installed first component to the entered details of the first component. The application is preferably configured for transmitting the entered details, the associated GPS location, and the attached one or more photographs from the mobile computing device to a server. The server (or the application running on the mobile computing device) may overlay an installation icon for the installed first component on a digital map at the GPS location of the installed first component. A link may be created by the application running on the mobile computing device (or by the server) and may be associated with the installation icon of the installed first component, such that toggling the installation icon may provide access (e.g., displaying of) the entered first component details, the GPS location of the installed first component, the one or more photographs on the digital map, etc.

Once the installation is completed and the data is properly entered, the application may be preprogrammed for automatically sending an email report containing the entered details, the GPS location, the one or more photographs of the installed first component, and the digital map with the installation icon to a preconfigured list of recipients.

The application may also be configured for verifying the entered details and the associated GPS location of the installed first component by an inspector. The inspection process may include accessing, by the inspector, the entered details and the GPS location of the installed first component using a verification screen. The inspector may first use a third-party GPS receiver to determine the GPS location of the installed first component, and may compare the third-party GPS receiver location of the installed first component with the entered GPS location of the installed first component. The inspector may also compare the details that had been entered into the system, with those shown on the actual component (e.g., its serial number). When the two GPS obtained positions are within a threshold amount (e.g., less than 1 meter), and when the details are correct, the inspector may confirm the veracity of the data (e.g., by toggling a radio button), which may then cause converting of the installation icon (which may be yellow) into a verified icon (which may be green). If any of the data is incorrect or beyond the threshold amount, the inspector works to correct the entered details and the GPS location of the installed first component.

Once the verification process is completed, the application may be preprogrammed for automatically sending an email report containing the entered details, the GPS location, the one or more photographs of the installed first component, and the digital map with the verification icon to the preconfigured list of recipients.

The application running on the ruggedized iPad® and the method may be used for various different PTC components, including, but not limited to, transponder installations, switch position sensors, control equipment, etc.

BRIEF DESCRIPTION OF DRAWINGS

The patent or application file contains at least one drawing executed in color. Copies of this patent or patent application publication with color drawing(s) will be provided by the Office upon request and payment of the necessary fee.

The description of the various example embodiments is explained in conjunction with appended drawings, in which.

DETAILED DESCRIPTION OF THE INVENTION

The patent or application file contains at least one drawing executed in color. Copies of this patent or patent application publication with color drawing(s) will be provided by the Office upon request and payment of the necessary fee.

As used throughout this specification, the word "may" is used in a permissive sense (i.e., meaning having the potential to), rather than a mandatory sense (i.e., meaning must), as more than one embodiment of the invention may be disclosed herein. Similarly, the words "include", "including", and "includes" mean including but not limited to.

The phrases "at least one", "one or more", and "and/or" may be open-ended expressions that are both conjunctive and disjunctive in operation. For example, each of the expressions "at least one of A, B and C", "one or more of A, B, and C", and "A, B, and/or C" herein means all of the following possible combinations: A alone; or B alone; or C alone; or A and B together; or A and C together; or B and C together; or A, B and C together.

Also, the disclosures of all patents, published patent applications, and non-patent literature cited within this document are incorporated herein in their entirety by reference. However, it is noted that citing herein of any patents, published patent applications, and non-patent literature is not an admission as to any of those references constituting prior art with respect to the disclosed and/or claimed apparatus/method.

Furthermore, any reference made throughout this specification to "one embodiment" or "an embodiment" means that a particular feature, structure or characteristic described in connection therewith is included in at least that one particular embodiment. Thus, the appearances of the phrases "in one embodiment" or "in an embodiment" in various places throughout this specification are not necessarily all referring to the same embodiment. Therefore, the described features, advantages, and characteristics of any particular aspect of an embodiment disclosed herein may be combined in any suitable manner with any of the other embodiments disclosed herein.

Figure 1:
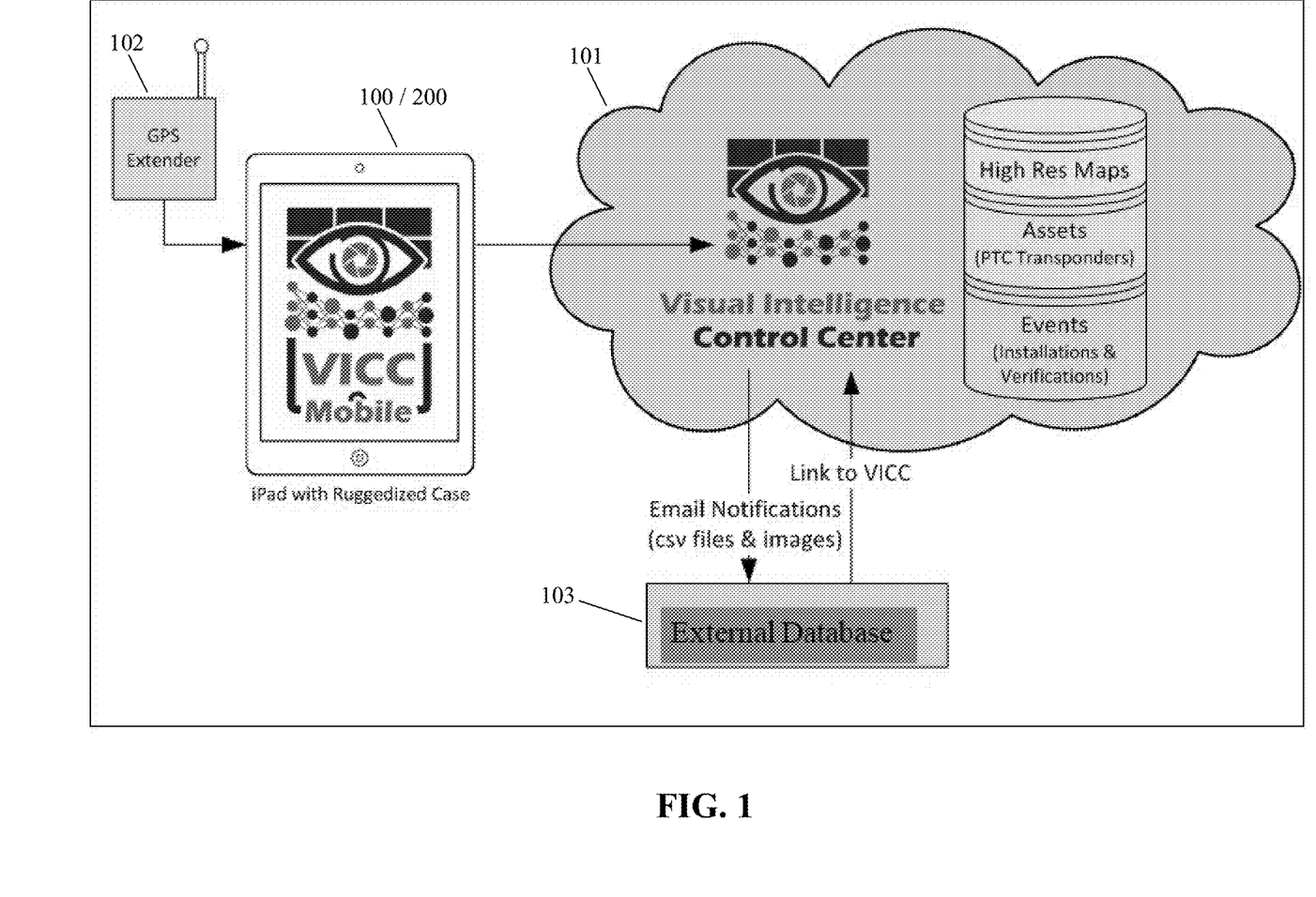
FIG. 1 illustrates the overall architecture of robust digital solution for installing, monitoring, and managing the implementation of Positive Train Control (PTC) components and systems across the country's rail lines.

FIG. 1 illustrates the overall architecture of a robust digital solution for installing, monitoring, and managing the implementation progress of Positive Train Control (PTC) components and systems across the country's rail lines. The process of installing, monitoring, and managing the progress of each project is cumbersome and manual.

The system may be cloud-based, and each installation crew may utilize in the field any suitable mobile computing device 100, including, but not limited to, an iPad with a ruggedized case that may have a GPS receiver and an external GPS antenna 102. The mobile computing device 100 may be configured to communicate wirelessly with a cloud-based control center 101. The cloud-based control center 101 may manage various different aspects of the system, and may communicate with, and store and access data within, an external database (e.g., a server), which interactions may be structured using any suitable interface now known or later developed (see e.g., U.S. Pat. No. 5,005,122 to Griffin; U.S. Pat. No. 8,620,879 to Cairns; U.S. Pat. No. 8,849,761 to Prahlad; U.S. Pat. No. 8,924,511 to Brand; and U.S. Pat. No. 9,571,579 to Vijayan).

Figure 2:
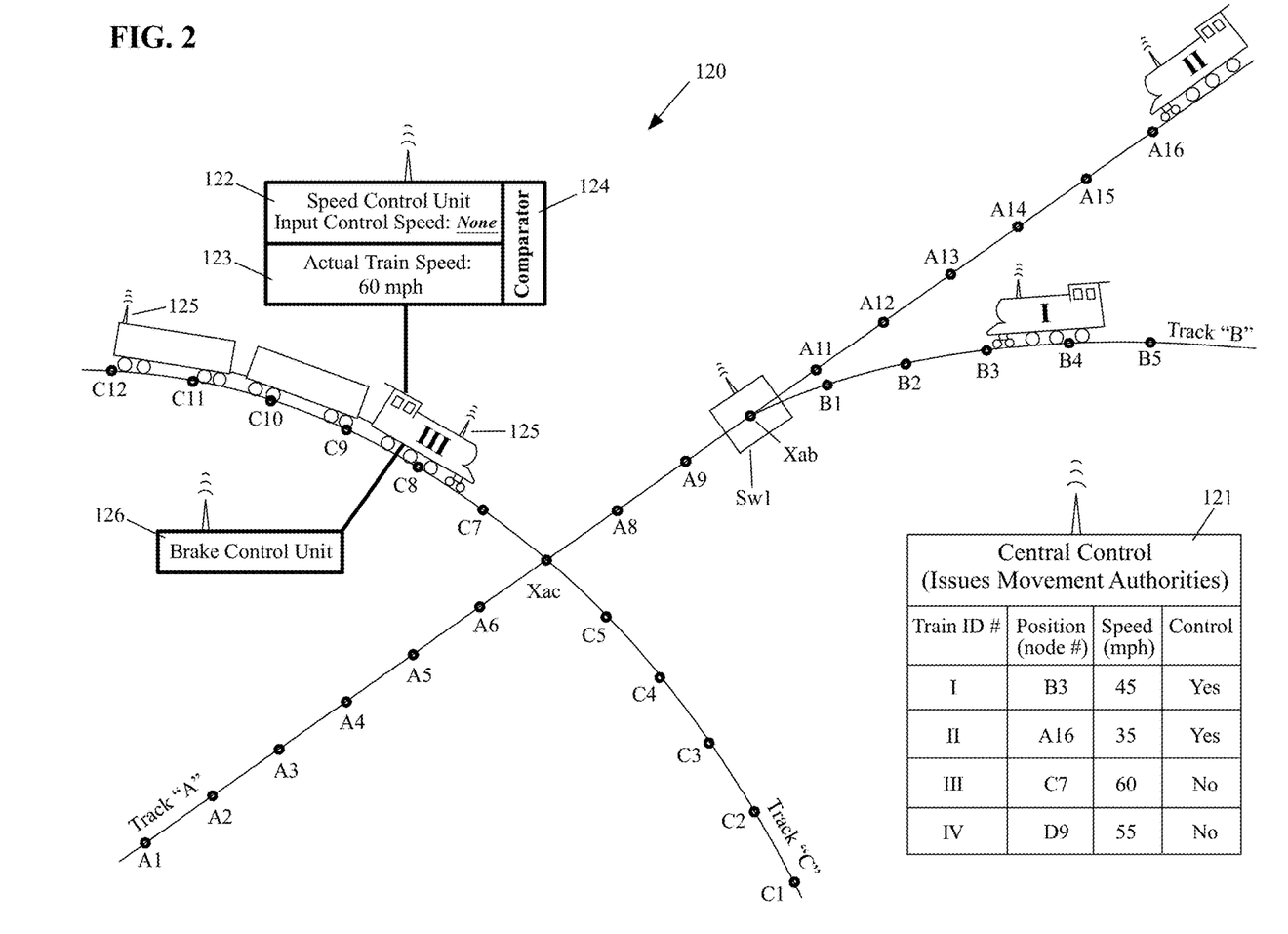
FIG. 2 illustrates various different equipment and aspects of a positive train control system.

FIG. 2 shows a positive train control system 120 that requires system-wide installation and verification, the entire process of which may be tracked and monitored to completion, and perpetually (i.e., during the performance of routine/required maintenance operations), as disclosed herein. The train control system 120 may be a processor-based/communication-based control system that is designed to prevent train collisions, improper switch positioning, excessive speeds, and other problems/accidents that may occur on a commuter or freight train line.

The positive train control system 120 may include a central controller 121 that may transmit instructions to trains (e.g., Train I, Train II, Train III, etc.) and may transmit control commands to track switches (e.g., to properly position switch Sw1), in order to grant movement authorities to the trains in the region covered by the central controller.

As seen in FIG. 2, the positive train control system 120 may also include:
   track node positions (e.g., "A1," "A2," "A3," etc. for track A) having a specific GPS position;
   switch position sensors (e.g., Sw1), which may have a bi-directional data link to inform the switching equipment of the train's presence and location, and to inform the train of the switch's position;
   a speed control unit 121 on the locomotive that may alter/override (i.e., increase or decrease) the train's speed that would otherwise be set and adjusted by the train engineer, to enforce fixed speed limits (e.g., around curves) based on an on-board navigation system and track profile database of the track nodes, and which altered speed may be controlled/input by the central control 121;
   an actual train speed indicator 122 that may indicate the train's actual ground speed, which may be indicated on a display in the drive control console in the train's driver/crew compartment;
   a comparator 124 that may compare the train's actual speed to the controlled/input speed from the central control 121 (when one has been issued), to determine if there is a difference, and if the speed control unit 121 must intervene to alter the train's current speed setting (i.e., by braking or by adding power);
   a transponder 125 on the locomotive and possibly one on the last car of the train as well, particularly where the length of the train is more than a few cars long (e.g., on a freight train that may have 200+ cars that stretches for a couple miles and may take more than a mile to stop from a speed of 55 mph);
   a brake control 126 that may trigger the actuation of the train's brakes independent of any action by the train engineer, to slow the train down to a desired speed, to provide safe spacing between two trains approaching a common point to avoid a potential collision (e.g., at node Xac in FIG. 2, which is common to track "A" and track "C"), according to input received from the central control 120, and/or according to input from a switch position sensor (e.g., switch Sw1), which may signal that the switch is incorrectly positioned for the train's approach and could cause a derailment.

The central controller 121 may track the position and speed of each train, and whether or not it has implemented a specific instruction/authority to a particular train to prevent an unwanted incursion with respect to another train (e.g., which may result in a collision) or an improper switch position or an excessively high speed (which may result in a train derailment).

As part of the implementation of the positive train control system 120, the control center 101 of FIG. 1 may be utilized to incrementally track progress to better ensure proper and complete installation of the Positive Train Control System components that still need to be installed and coupled to existing system components and capabilities, and monitoring and managing of the installation process and the overall system.

Figure 3:
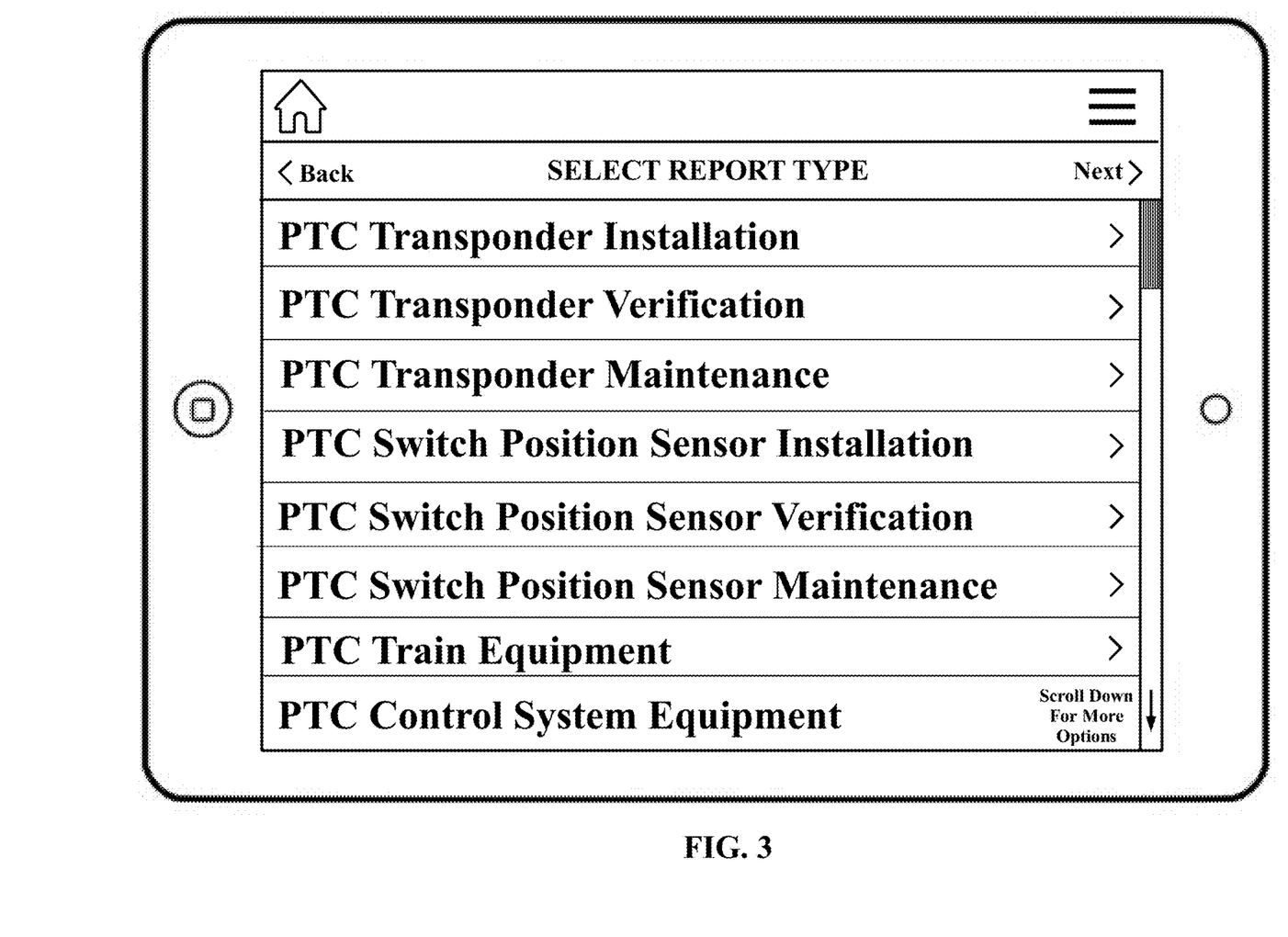
FIG. 3 illustrates a ruggedized mobile smart device showing a screen that permits selection of a desired component installation and/or verification with respect to the PTC system.
Figure 4:
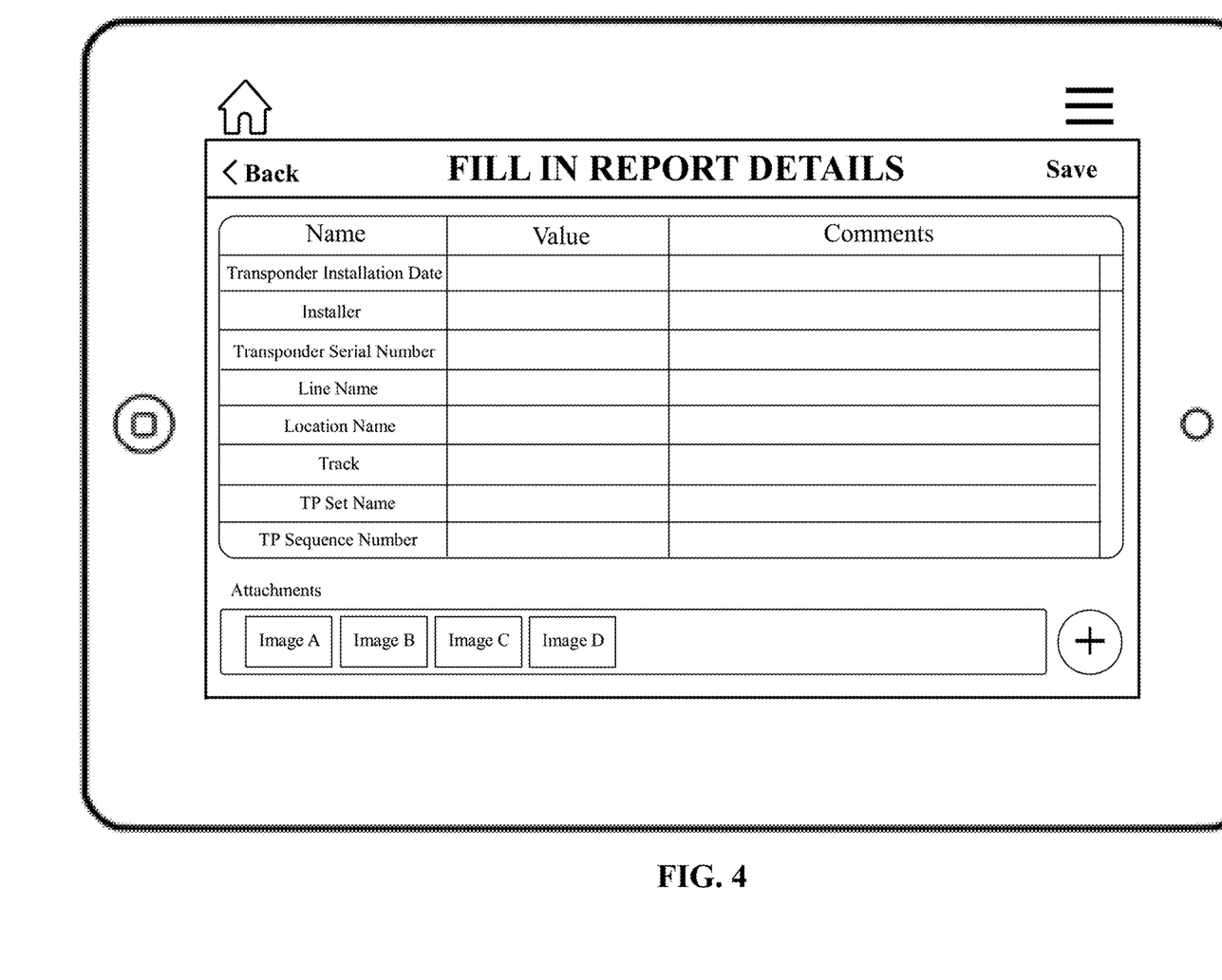
FIG. 4 illustrates a ruggedized mobile smart device showing a screen that permits selections and entry of details for a PTC Transponder being installed in the system.
Figure 7:
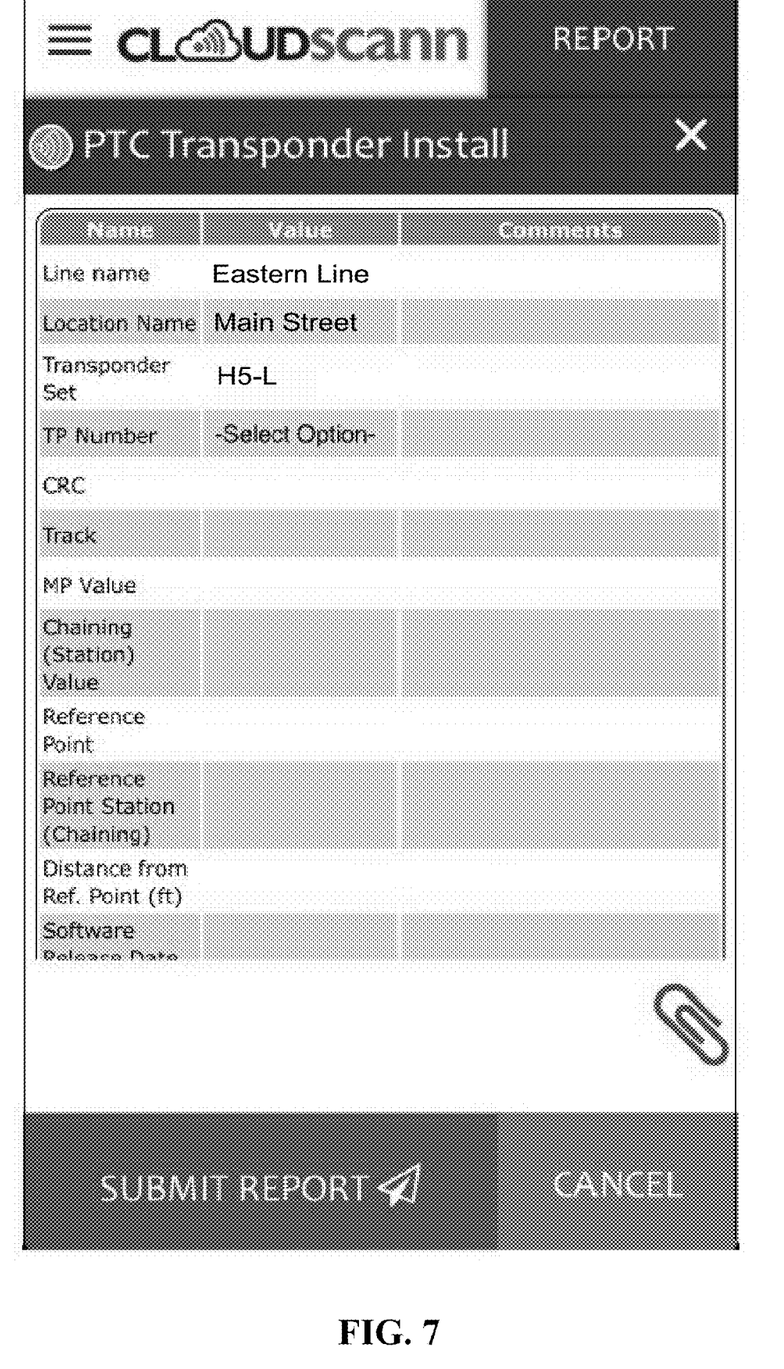
FIG. 7 illustrates an app running on a mobile device that is shown displaying a PTC Transponder Installation Status Report screen, when the installation is at a first stage of completion.
Figure 8:
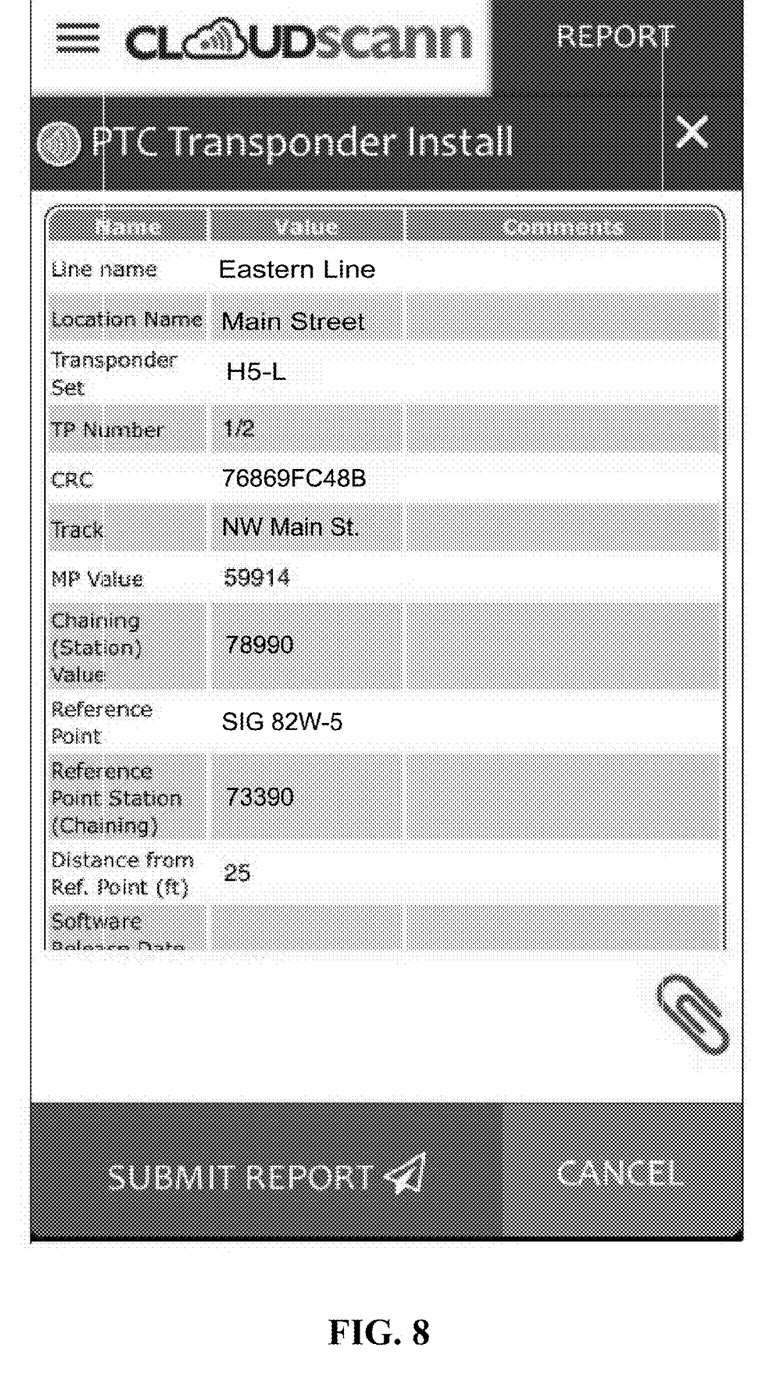
FIG. 8 illustrates the application and mobile device of FIG. 7, but where it is shown displaying the PTC Transponder Installation Status Report screen when the installation is at a second stage of completion.

During implementation/installation of the Positive Train Control system 120, a crew of workers may install each component and may make appropriate inputs in the mobile computing device 100. For example, as the crew installs a transponder 125, the crew leader may access the graphical user interface displayed in the screen of the mobile computing device 100, as shown in FIG. 3, and may toggle the "PTC Transponder Install" option, which may result in the display seen in FIG. 4. The crew leader (or a worker) may input the information about the particular transponder into the first column, e.g., the type/serial number of the transponder installed, the name of the installer, the date it was installed, the name of the train line (e.g., Eastern Line), the location (e.g., a description such as "Main Street"), the Transponder Set installed (e.g., "H5-L"), etc. The form in the GUI screen is fully customizable/configurable so that more form fields may be added as needed for a unique installation. Comments may also be added about the installation, which may be useful to be correlated thereto, particularly when the installation is later being verified by an inspector. One or more photographs of the installed PTC component and other significant data related to completion of the installation may be attached, as seen in FIG. 4 (e.g., Image A, Image B, Image C, Image D . . . ), using the "+" button. The crew leader (or a worker) may also input other associated information related to the particular installation, over the course of time, to monitor overall progress (see e.g., FIG. 7 and FIG. 8).

Where an installation is at a fixed location, the crew may mark (i.e., determine) the exact GPS location for the installed PTC Transponder equipment using an internal GPS receiver of the ruggedized iPad® (or a 3rd party GPS receiver/antenna), which GPS coordinates may be input as the "Location" in the graphical user interface, being input either automatically (when using an internal GPS receiver) or manually (when using an external $3^{rd}$ party GPS receiver).

Upon entry, the data may be submitted by the mobile computing device 100 to the control center 101, after which the following actions may be automatically triggered in the background:
  a) Creation of new Installation Report with all form data and images;
  b) Placement of the installed equipment location on a map using an icon (i.e., geolocated on the map image—see FIG. 5), with the icon reflecting an installed PTC asset that is not yet verified; and
  c) Creation of an email report with .csv file containing all form data as well as attached images, with a link being provided in the email for the recipient to directly browse each installed and geolocated asset on the map (note—the email may be sent to a preconfigured list of recipients).

Once the installation email report is received, the next step is to verify that the PTC equipment (e.g., a switch or fixed transponder) was properly installed and is located within 1 meter of the required geolocation.

A supervisor/inspector (e.g., a QAQC engineer) may travel to each installation site and may verify the integrity of each installation (e.g., verify the equipment is installed properly and located in the correct geolocation using a $3^{rd}$ party GPS antenna). The inspector may also access the "PTC Transponder Verification" option shown in the graphical user interface (GUI) screen displayed in the display screen of the mobile computing device 100 of FIG. 3, which may result in the display of different fields depending upon the type of installation.

The "PTC Transponder Verification" option may be password protected so that only a supervisor or inspector may utilize the feature to verify the installation; or alternatively, a separate mobile computing device 200 may be used, and which may include only that feature and which may require using a $3^{rd}$ party GPS for location confirmation (i.e., using separate devices for installation and for verification, rather than just different display screens & password protected access).

Figure 9:
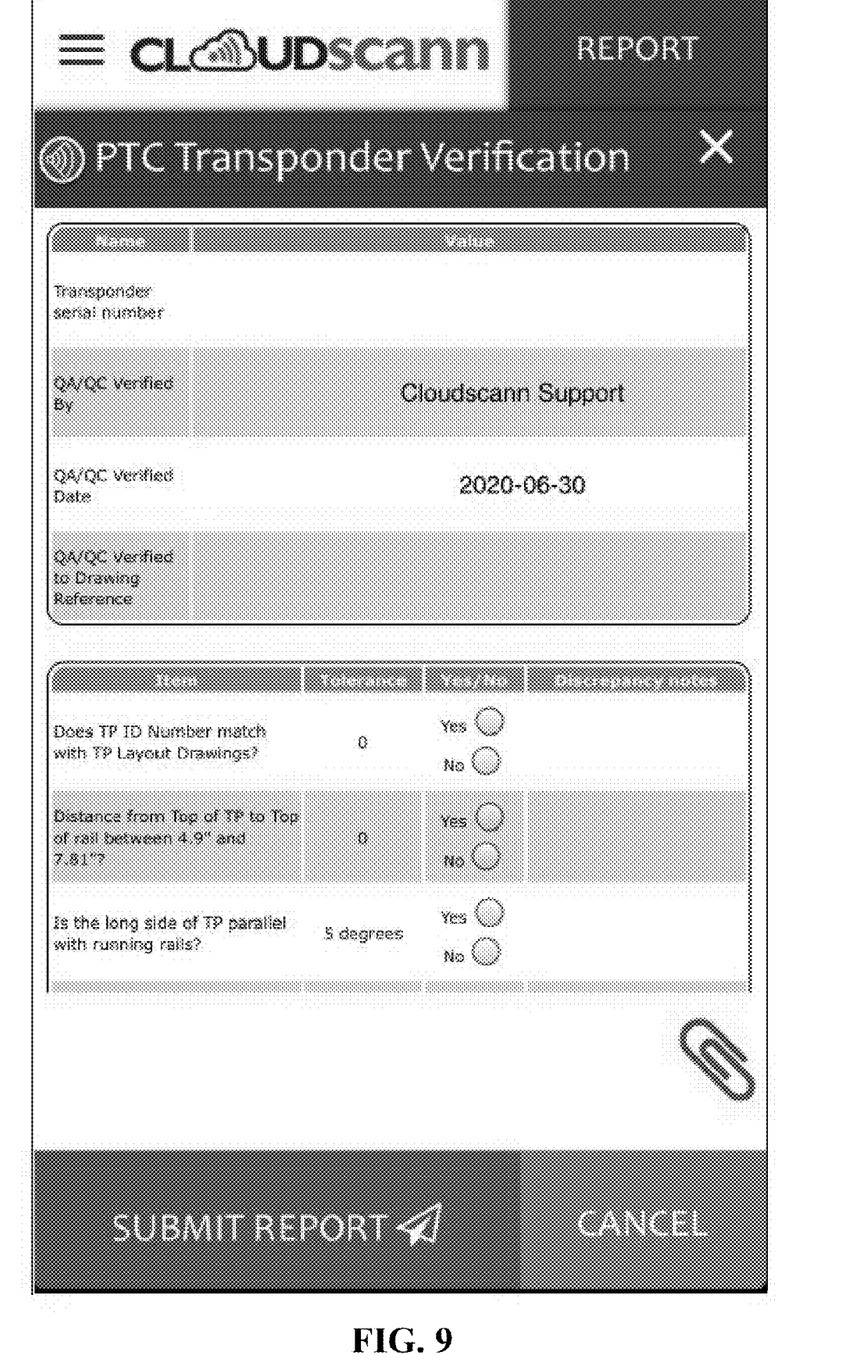
FIG. 9 illustrates the application and mobile device of FIG. 7, but where the screen is shown displaying a PTC Transponder Verification Report screen.

FIG. 9 is illustrative of a screen that may be used for a transponder installation. The supervisor/inspector may make inputs relating to the verification (e.g., "Does the TP Number match with TP Layout Drawings"), which may serve to authenticate and improve the nationwide installation, which has problems in many regions of the country. If there are any errors in the serial number or the GPS position, the inspector may have override authority to correct the errors for each of those entries. If there are no errors, the inspector may just sign off that the installation is verified as originally entered by the work crew, as seen in FIG. 9. As shown in FIG. 3, a similar verification may be made with respect to routine maintenance that is needed on any aspect of the positive train control system 120 (e.g., the option: "PTC Transponder Maintenance"). The system may also be used to monitor repairs for a component that may fail be detected by the system as having failed or no longer functioning properly.

Once the verification inputs are submitted it too may trigger certain actions in the background:
  a) Creation of a new/updated Installation Report with all form data and images;
  b) Updating of previously created PTC asset icons/data with new attributes based on form details and a changed status as being "verified";
  c) Creation of an email report with .csv file containing all form data as well as attached images, with a link being provided in the email for the recipient to browse directly the asset and attributes on the map (note—the email may be sent to a preconfigured list of recipients, some or all of which may be common to the recipients regarding the installation status).

Each of the node positions (e.g., "A1," "A2," "A3," as shown in FIG. 2), for each track (e.g., track A, track B, track C, etc.) may also be input into the mobile computing device 100 (e.g., using the ruggedized iPad® or a 3rd party GPS antenna), and all of these PTC Train Control system 120 aspects may be stored in the database 103.

Figure 5:
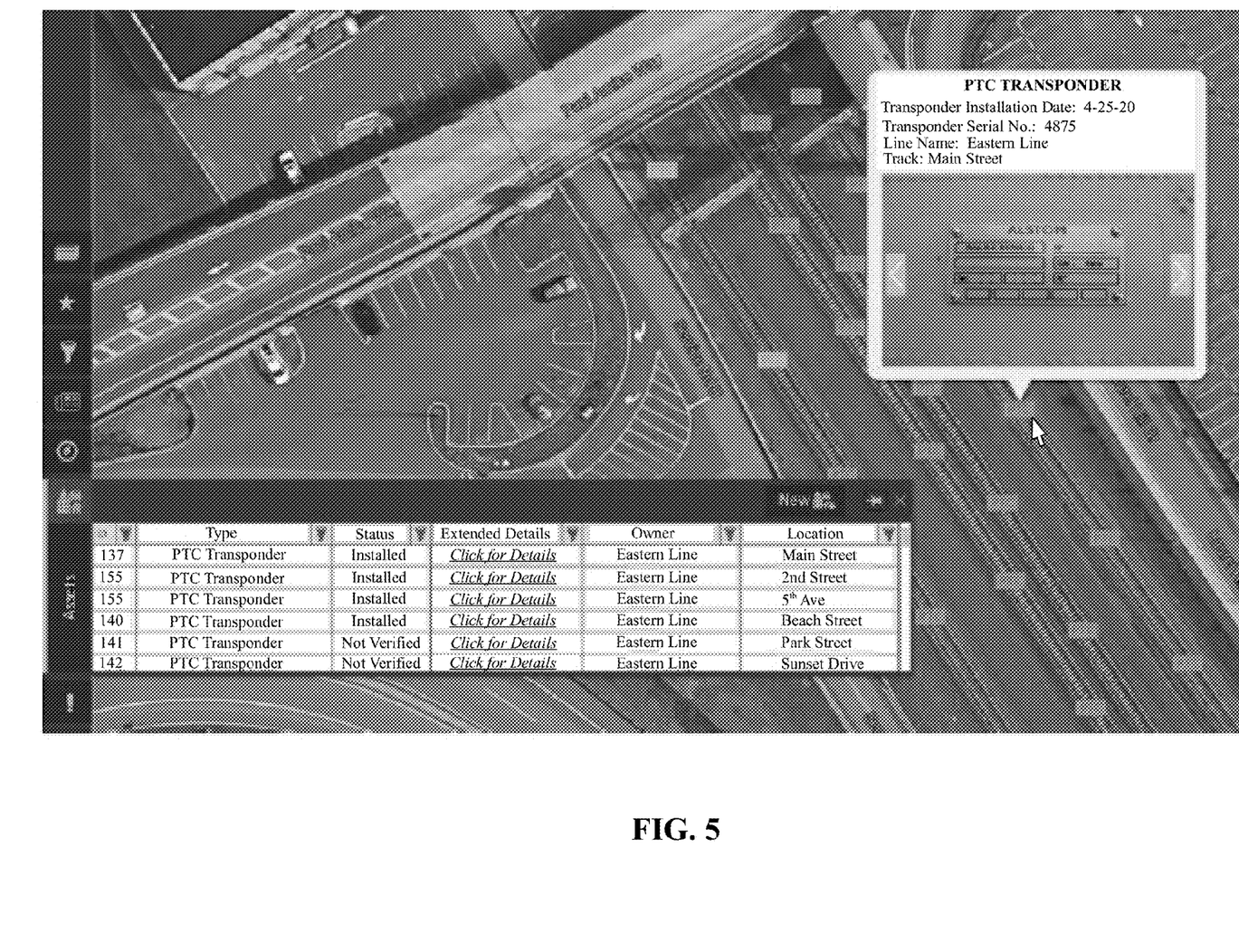
FIG. 5 is a map overlaid with reported PTC equipment/component locations and other related features.

As seen in FIG. 5, the overall PTC Train Control system 120 condition and status may be visualized on a display screen of any device, including but not limited to the Mobil computing device 100 (and/or a display screen coupled to the server), permitting a review of the progress. The display may be in the form of a geo-reference map, which may include the layout (i.e., positioning) of each track (e.g., track A, track B, track C, etc.) via the GPS node locations (e.g., "A1," "A2," "A3," etc. for track A); the positioning of each switch sensor (e.g., the GPS position of switch Sw1), the positioning of each transponder in the system, and the positioning of any other piece of equipment.

Figure 6:
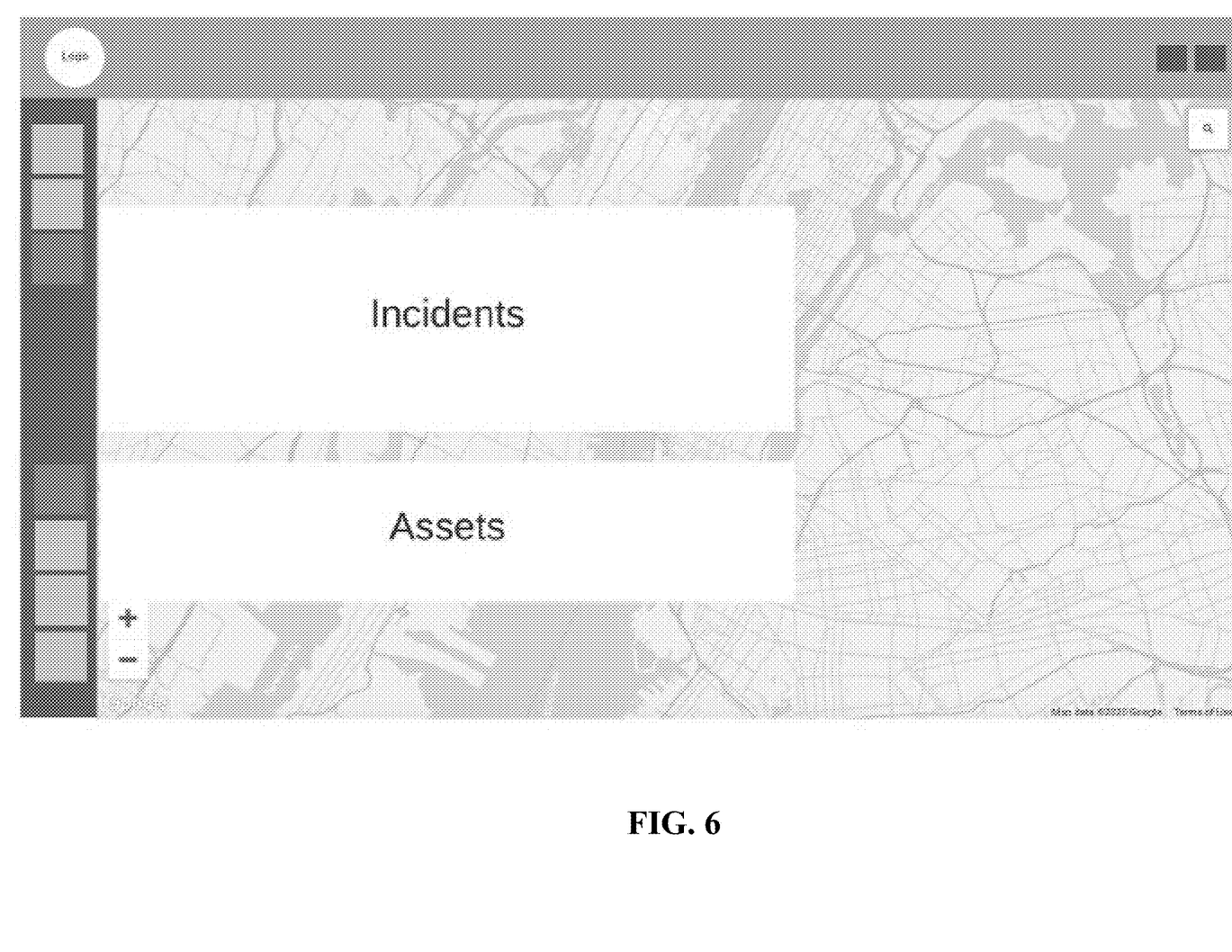
FIG. 6 illustrates a screen permitting selection of a map overlay which may show installations/assets overlaid on a map.

The data may be overlaid onto the map in various different layers, including, but not limited to, an incident layer, and an asset layer, and the user may be provided an option (see FIG. 6) to limit viewing to only one of those layers. The Incident Layer may be a map overlay that shows markers/icons for any incident at the location where the incident was reported. The Asset Layer, as seen in FIG. 5, is a map overlay of markers/icons that represent assets deployed to the field that are required by the system and which may require remote monitoring and/or maintenance. The Map Overlays may constitute a collection of geolocated markers that can be overlaid on top of a geographical (digital) map, such as Google Maps, so that a user may easily monitor geographically distant "Assets" or "Incidents" from a web browser.

In FIG. 5, the green and yellow PTC rectangles are in the layer created to display assets. The green rectangles represent "verified" assets, while the yellow rectangles are assets that are "not verified" yet by an inspector. As shown in FIG. 5, when one of the PTC rectangles is selected using the cursor, a window pops up showing the pictures of the equipment that had been attached during the installation—e.g., the PTC transponder tag (with left and right arrows for displaying of the additional pictures when more than one picture was attached), as well as the install date, serial number line name, track, etc.

Software of the present invention may run on a suitable computing device, such as a server, a tablet, a cell phone, or other mobile smart device, so a description of such an exemplary computer system is hereinafter disclosed. Exemplary computer system 200 (i.e., a client device associated with a particular user) is shown schematically in FIG. 10, and which may comprise computing unit 201 interacting with external peripherals 202, such as a separate touch screen display 244, and interacting with network resources 203, including use of the internet 261, and other computers (or other client devices or a server), which may be a laptop computer 262 (i.e., a second client device associated with a second user), a smart phone 263 (i.e., a third client device associated with a third user), a server 264, etc.

Figure 10:
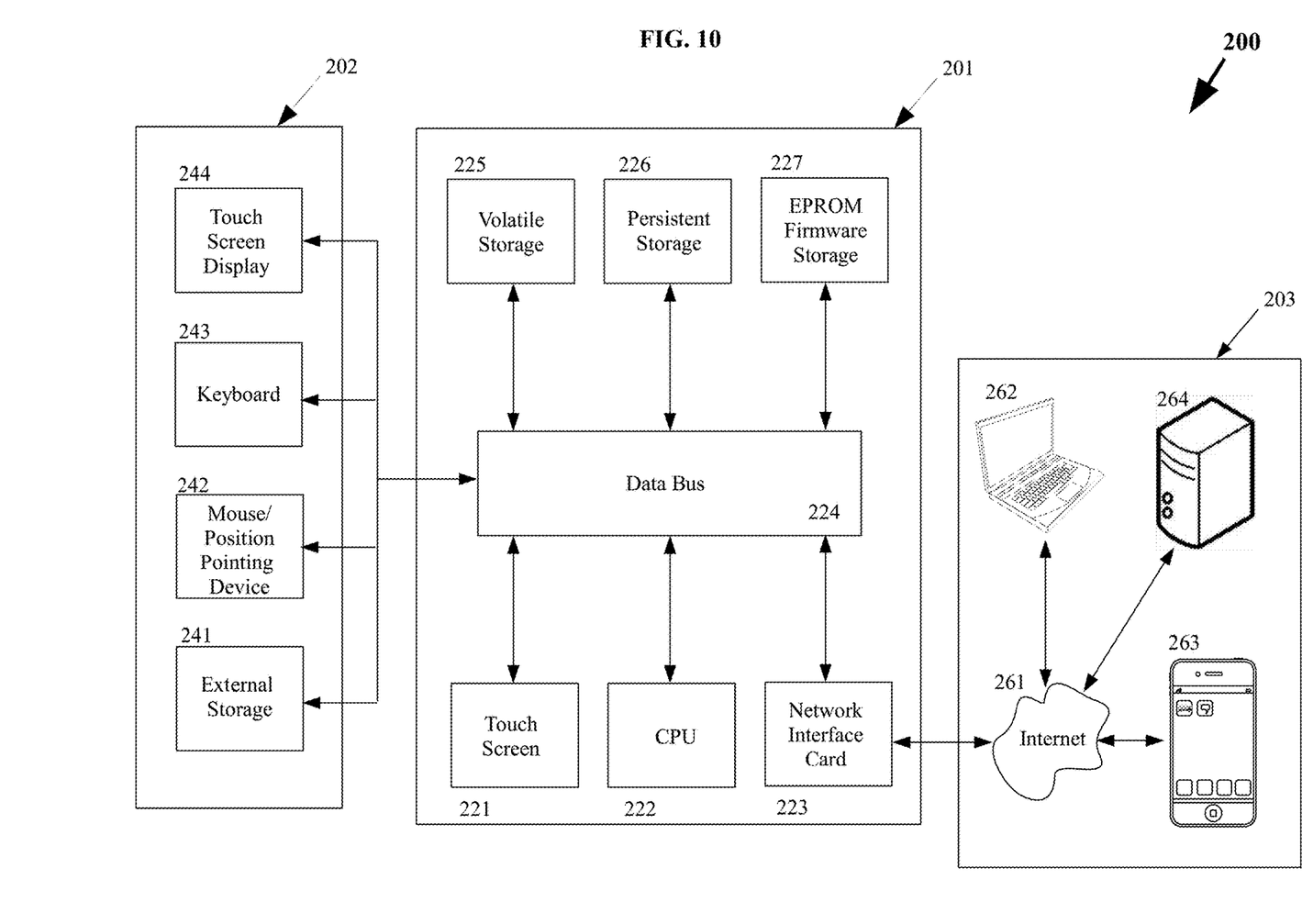
FIG. 10 is a schematic illustration showing an exemplary computing unit capable of being programmed by the instructions of the software of the present invention, and which may include personal computers, cellular phones, and other mobile devices.

The computing unit 201 may include a data bus 224 for communicating information across and among various parts of computing unit 201, and a central processing unit, which may be a microprocessor (hereinafter "processor" or "CPU") 222 coupled with a bus 224 for processing information and performing other computational and control tasks. Computing unit 201 may also include a volatile storage 225, such as a random access memory (RAM) or other dynamic storage device, coupled to bus 224 for storing various information as well as instructions to be executed by processor 222. The volatile storage 225 may also be used for storing temporary variables or other intermediate information during execution of instructions by processor 222. Computing unit 201 may further include a read only memory (ROM) or an erasable programmable memory (EPROM) 227 or other static storage device coupled to bus 224 for storing static information and instructions for processor 222, such as basic input-output system (BIOS), as well as various system configuration parameters. A persistent storage device or non-volatile memory 226, such as a magnetic disk, optical disk, or solid-state flash memory device may be provided and may be coupled to bus 224 for storing information and instructions.

Computing unit 201 may be coupled via bus 224 to an integral display 221, possibly a touch-screen display, for use in displaying information to a user. If desired, computing unit 201 may be coupled via bus 224 to an external display screen 244. An external input device 243 (e.g., a standard keyboard) may be coupled to bus 224 for communicating information and command selections to processor 222. A cursor control device 242, such as a mouse, a trackball, or cursor direction keys, may be used for communicating direction information and command selections to processor 222 and for controlling cursor movement on display 244. An external storage device 241 may be connected to the computing unit 201 via bus 224 to provide an extra or removable storage capacity for the computing unit 201, which may be used to facilitate exchange of data with other computer systems.

Some of the techniques herein may be performed by computing unit 201 in response to processor 222 executing one or more sequences of one or more instructions contained in the volatile memory 225. Execution of the sequences of instructions contained in a non-transitory memory may cause processor 222 to perform the process steps described herein. In alternative embodiments, specific hard-wired digital circuitry may be used in place of, or in combination with, software instructions to implement the invention.

The term "computer-readable medium" as used herein refers to any medium that participates in providing instructions to processor 222 for execution. The computer-readable medium is just one example of a machine-readable medium, which may carry instructions for implementing any of the methods and/or techniques described herein. Various forms of computer readable media may contain one or more sequences of one or more instructions for the processor 222 to execute, including non-volatile media (storage device 226), and volatile media (storage device 225). Common forms of computer-readable media include, for example, a floppy disk, a hard disk, magnetic tape, or any other magnetic medium, a CD-ROM, a flash drive, and a memory card.

The computing unit 201 may thus also include a communication interface, such as network interface card 223 coupled to the data bus 222. Communication interface 223 may provide a two-way data communication coupling to a network link that may be connected to a local network. For example, communication interface 223 may be an integrated services digital network (ISDN) card or a modem to provide a data communication connection to a corresponding type of telephone line, or it may be a local area network interface card (LAN NIC) to provide a data communication connection to a compatible LAN.

Network link 223 also typically provides data communication to other network resources. For example, the network link may provide a connection over the internet 261 to the world-wide-web. Thus, the computing unit 201 can access resources located anywhere using the Internet 261. Also, the computing unit 201 may also be accessed by, or communicate with, other computers (e.g. 262), or another smart device (e.g., smartphone 263), generally with permission, and which may be located anywhere with access to the internet 261.

While illustrative implementations of one or more embodiments of the disclosed apparatus are provided hereinabove, those skilled in the art and having the benefit of the present disclosure will appreciate that further embodiments may be implemented with various changes within the scope of the disclosed apparatus. Other modifications, substitutions, omissions and changes may be made in the design, size, materials used or proportions, operating conditions, assembly sequence, or arrangement or positioning of elements and members of the exemplary embodiments without departing from the spirit of this invention.

Accordingly, the breadth and scope of the present disclosure should not be limited by any of the above-described example embodiments, but should be defined only in accordance with the following claims and their equivalents.

The invention claimed is:

1. A method of installing a plurality of components of a positive train control system (PTC) configured to monitor one or more of train positions, train speeds, and track switch positions throughout a rail system, and of verifying proper installation of each of the plurality of components, said method comprising:
creating an installation graphic user interface (GUI) screen;
entering one or more details about each of the plurality of components of the PTC system into the installation GUI;
identifying a predetermined installation location for each of the plurality of components of the PTC system using an internal GPS receiver of a mobile computing device;
installing each of the plurality of components of the PTC system at the respective identified installation location;
automatically entering, into the respective one or more details, GPS coordinates of each of the installed plurality of components obtained by the internal GPS receiver of the mobile computing device;
taking a photograph of each of the installed plurality of components;
attaching the photograph of each of the installed plurality of components to the respective entered details;
overlaying an installation icon on a digital georeferenced map at the respective GPS coordinates for each of each of the installed plurality of components;

creating a verification GUI screen to verify operability of the positive train control system:

verifying, by an inspector using the verification GUI, said automatically entered GPS coordinates and the one or more details of each of the installed plurality of components, said verifying comprising:

accessing, by the inspector, said automatically entered GPS coordinates and the entered details of each of the installed one or more components using the verification GUI screen;

comparing, by the inspector, the entered details with actual details of each of the installed plurality of components;

correcting, by the inspector, any of the entered details of the installed plurality of component when determined to be inaccurate;

independently determining, by the inspector using a $3^{rd}$ party GPS receiver, the GPS location of each of the installed plurality of components;

comparing the GPS location of each of the installed plurality of components obtained using the $3^{rd}$ party GPS receiver with the predetermined installation location; and     converting the installation icon into a verified icon for each of the installed plurality of components found by the $3^{rd}$ party GPS receiver to be located within a threshold distance of the predetermined installation location;

wherein when any of the installed plurality of components is erroneously located beyond a threshold distance away from the predetermined installation location, identifying each such erroneously located component on the georeferenced map; and correcting the installation of each such erroneously located component.

2. The method according to claim 1 further comprising: converting the installation icon into a verified icon for each such erroneously located component, after said correcting of the installation of each such erroneously located component.

3. The method according to claim 2 further comprising: transmitting, from the mobile computing device to a server, the entered details, the automatically entered GPS coordinates, the attached photograph for each of the installed plurality of components, and the digital map with each installation icon and each verification icon.

4. The method according to claim 3 further comprising: creating a link associated with the installation icon and each verification icon of each of the installed plurality of components, with toggling of the link causing one or more of: displaying of the entered details, displaying of the GPS location, displaying of the photograph on the digital map, and displaying of the digital map with each installation icon and each verification icon.

5. The method according to claim 4 further comprising coloring each installation icon a yellow color, and coloring each verification icon a green color.

6. The method according to claim 5 wherein said entering one or more details about each the plurality of components of the PTC system comprises one or more of:

entering a type of component;
    entering a serial number;
    entering a name of the installer;
    entering a train line name; and
    entering a location description.

7. The method according to claim 6 further comprising: sending, to a preconfigured list of recipients, a report containing the entered details, the GPS location, the photograph of each of the plurality of installed components, and the digital map with each installation icon and each verification icon.

\* \* \* \* \*